UNITED STATES PATENT OFFICE.

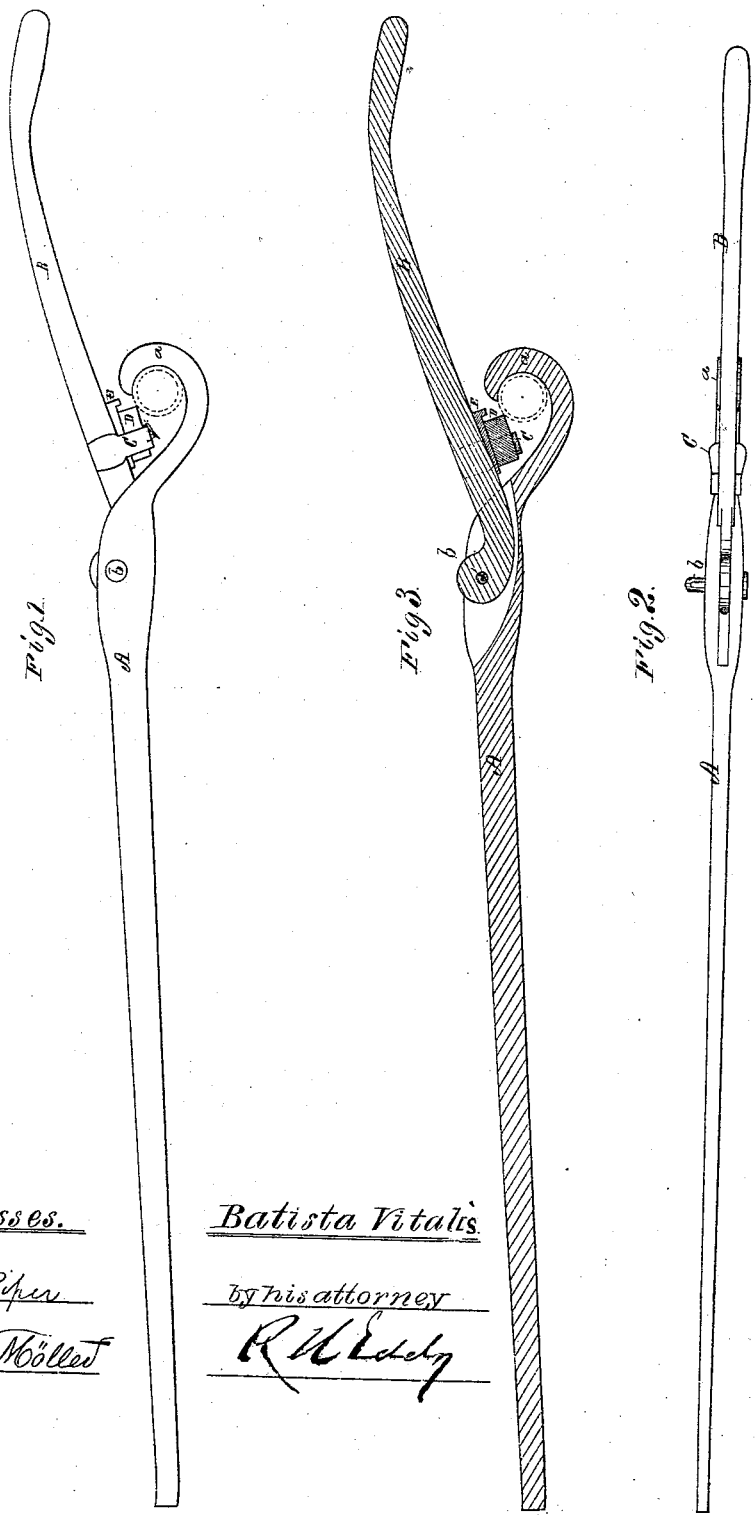

BATISTA VITALIS, OF ATHENS, GREECE.

IMPROVEMENT IN PIPE-COUPLING HOLDERS.

Specification forming part of Letters Patent No. 125,916, dated April 23, 1872.

*To all persons to whom these presents may come:*

Be it known that I, BATISTA VITALIS, of Athens, of the Kingdom of Greece, have invented a new and useful or Improved Pipe-Coupling Holder; and do hereby declare the same to be fully described in the following specification and represented in the accompanying drawing, of which—

Figure 1 is a side elevation; Fig. 2, an edge view; and Fig. 3, a longitudinal section of it.

The object of my said pipe-coupling holder is to enable a person to firmly hold from revolving a pipe-coupling while one or two pipes are in the act of being screwed into it by mechanism, and to enable the coupling to be suddenly released from the gripe of the holder, or the holder from the coupling when the latter may have been screwed the proper distance upon or "hard up" on the pipe or pipes.

In connecting two pipes by a short tube or coupling to be screwed on the said pipes it is customary to hold, by means of common pinchers, the coupling while the pipes adjusted to it are put in revolution by mechanism so as to screw them into the coupling. It generally requires much care and skill on the part of a person grasping the pinchers to prevent them from being suddenly revolved with the pipes on their coupling reaching the termini of the screws, or being screwed "hard up," in common parlance. Unless the grasp of the pinchers on the coupling is released at the proper instant the party holding the pinchers is liable to have them thrown out of his hands or to be injured by them. With my coupling-holder there is, comparatively speaking, no danger of injury to the party, and this owing to the manner in which, when in use, it is applied to the coupling or arranged with it and the pipes to be coupled.

The implement or contrivance in question consists of a long hooked bar, A, formed as shown, and an arm or lever, B, pivoted, at or near one end, to the hooked bar and near the base of the hook *a* thereof, the pivot being shown at *b*. A staple or yoke, C, is extended from the arm B, at right angles thereto, as represented, and contains a block, D, of steel, which, arranged in it as shown, is held in place by a wedge, E, driven through the yoke and between the block and the arm, all being arranged as shown in the drawing. The block of steel becomes a movable jaw, adjustable within the yoke, and held in position by the key or wedge. This jaw is to operate with the hook *a* in holding a coupling.

In using the coupling-holder, the long hooked lever or part A is to stand inclined with its smaller end resting on the floor and with the pivot of the hook upward and against the coupling, the arm B being turned over the hook so as to bring the angular edge of the block D in contact with the coupling; the coupling being supposed to be within and embraced by the hook, the attendant then, in order to hold the coupling firmly, has only to press downward the arm B with either or both of his hands. On the pipes having entered or being screwed hard up into the coupling so as to cause it to revolve, it will readily turn in the hook, or between such and the jaw, without causing accident to the attendant.

I claim as my invention—

The lever A carrying one jaw, and the arm B carrying the other jaw of the pipe-coupling holder or pipe-tongs, combined and arranged for operation substantially as specified.

BATISTA VITALIS.

Witnesses:
R. H. EDDY,
J. R. SNOW.